United States Patent
Iwano et al.

(10) Patent No.: US 7,884,704 B2
(45) Date of Patent: Feb. 8, 2011

(54) BODY STRUCTURE OF VEHICLE HAVING SIDE-COLLISION DETECTION SENSOR

(75) Inventors: Yoshihiro Iwano, Toyota (JP); Takashi Yao, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 568 days.

(21) Appl. No.: 11/989,419

(22) PCT Filed: Jul. 20, 2006

(86) PCT No.: PCT/JP2006/314818

§ 371 (c)(1), (2), (4) Date: Jan. 25, 2008

(87) PCT Pub. No.: WO2007/013535

PCT Pub. Date: Feb. 1, 2007

(65) Prior Publication Data

US 2009/0033476 A1      Feb. 5, 2009

(30) Foreign Application Priority Data

Jul. 27, 2005   (JP)   ............................. 2005-218057

(51) Int. Cl.
  *B60Q 1/00*   (2006.01)
(52) U.S. Cl. ........................ 340/436; 340/435; 340/438; 340/933
(58) Field of Classification Search ................. 340/436, 340/435, 438, 933
See application file for complete search history.

(56) References Cited

U.S. PATENT DOCUMENTS 5,934,703 A    8/1999   Mimura et al.
7,400,958 B2 *  7/2008   Lich et al. ..................... 701/45
2004/0059487 A1 *  3/2004   Lich et al. ..................... 701/45

(Continued)

FOREIGN PATENT DOCUMENTS

EP    0 807 559   11/1997

(Continued)

OTHER PUBLICATIONS

Extended European Search Report dated Oct. 14, 2009 for EP Appl. No. 06781730.4.

*Primary Examiner*—Daryl Pope
(74) *Attorney, Agent, or Firm*—Finnegan, Henderson, Farabow, Garrett & Dunner, LLP (57) ABSTRACT

A body structure of a vehicle reliably detects, with a side-collision detection sensor disposed on a pillar, a side-collision of a side door of a vehicle body against a pole and particularly a side-collision against a pole in a diagonal direction. A metal bracket that projects toward a vehicle width direction outer side is disposed on an outer side surface in a predetermined position (substantially intermediate position between a front pillar and a center pillar) of a rocker. By setting this metal bracket on the outer side of the rocker, in addition to an impact beam disposed inside a door, an acceleration (sensor G) transmitted to the side-collision detection sensor disposed inside the center pillar increases during a side-collision against a pole in a diagonal direction, so the side-collision state can be reliably and rapidly detected even at a position distant from the center pillar.

20 Claims, 10 Drawing Sheets

U.S. PATENT DOCUMENTS

2008/0303254 A1* 12/2008 Le et al. .................... 280/735
2009/0248253 A1* 10/2009 Le et al. ...................... 701/45

FOREIGN PATENT DOCUMENTS

| | | |
|---|---:|---:|
| GB | 2 266 075 | 10/1993 |
| JP | 8-183341 | 7/1996 |
| JP | 2576582 | 4/1998 |
| JP | 10-509108 | 9/1998 |
| JP | 2000-95151 | 4/2000 |
| JP | 3331861 | 7/2002 |
| JP | 3341628 | 8/2002 |
| JP | 3371649 | 11/2002 |
| JP | 2002-347655 | 12/2002 |
| JP | 3407549 | 3/2003 |
| JP | 3440904 | 6/2003 |
| JP | 3463510 | 8/2003 |
| JP | 3484925 | 10/2003 |
| JP | 3716663 | 9/2005 |
| TW | 304923 | 5/1997 |
| TW | M245100 | 10/2004 |
| TW | M270081 | 7/2005 |

\* cited by examiner

BODY STRUCTURE OF VEHICLE HAVING SIDE-COLLISION DETECTION SENSOR

TECHNICAL FIELD

The present invention relates to a body structure of a vehicle suited for detecting a side-collision at a position offset from a pillar using a side-collision detection sensor disposed on the pillar.

BACKGROUND ART

In recent years, head region protection airbag devices that deploy an airbag in a curtain-like manner downward of a roof side rail portion and side airbag devices that deploy, between the chest region or the like of a passenger and a side door, a side airbag housed in a seat back side portion during a side-collision have come to be installed in vehicles as passenger protection assistance devices.

In order to actuate these head region protection airbag devices and side airbag devices, a side-collision detection sensor for detecting a side-collision state becomes necessary, and this sensor is usually disposed on the lower side of the inside of a center pillar (B pillar) or the like.

Here, a body structure for shortening the amount of time of detection by this type of side-collision detection sensor disposed inside a center pillar is disclosed in Japanese Patent Publication No. 3,484,925. To briefly describe, the body structure has a configuration where a cross-sectionally L-shaped reinforcement member is set on a lower portion inside a front side pillar. The reinforcement member has a predetermined dimension in the door anteroposterior direction, and during a side-collision (diagonal collision) against the front side door, the body structure is configured to transmit the acceleration from the lower portion of the front side door to the reinforcement member and further transmit the acceleration from the reinforcement member to an outer side upper portion of a rocker to thereby control transmission loss of the acceleration and finally efficiently and rapidly transmit the acceleration during the diagonal collision to the side-collision detection sensor disposed inside the center pillar.

However, according to the prior art disclosed in Japanese Patent Publication No. 3,484,925, in the case of a side-collision of the side door against a pole, and particularly a side-collision or the like against a pole in a diagonal direction, the amount of time to detect the collision using the side-collision detection sensor becomes longer because the acceleration transmitted to the side-collision detection sensor disposed inside the center pillar is small. Consequently, the body structure disclosed in Japanese Patent Publication No. 3,484,925 has room for improvement in regard to this point.

It will be noted that although several side-collision sensors may also disposed inside the rocker in order to solve this problem, in that case this leads to an increase in cost and the control system becomes complicated.

DISCLOSURE OF THE INVENTION

In view of these circumstances, it is an object of the present invention to obtain a body structure having a side-collision detection sensor that can reliably detect, with a side-collision detection sensor disposed on a pillar, a side-collision of a pole against a side door and particularly a side-collision against a pole in a diagonal direction.

A first aspect of the invention is a body structure having a side-collision detection sensor configured to include: a side door that opens and closes a door open portion in a vehicle body side portion; a rocker disposed along a vehicle anteroposterior direction on a lower edge of the door open portion; and a pillar that rises toward a vehicle upper side from a predetermined position in a longitudinal direction of the rocker, with a side-collision detection sensor that detects a side-collision state from an acceleration being attached at a predetermined position on a lower portion of the pillar, wherein a impact transmission member that projects a predetermined length in a vehicle width direction and transmits impact during a side-collision to the side-collision detection sensor is disposed on at least one of a vehicle width direction outer side of a site corresponding to a side region of a seated passenger in the longitudinal direction of the rocker and an inner side of an outer cover member that covers an outer side portion of the rocker.

A second aspect of the invention is the body structure having a side-collision detection sensor of the first aspect, wherein a beam-like reinforcement member is disposed inside the side door across substantially the entire length of the side door along the door anteroposterior direction, and the body structure is configured such that the impact transmission member collides with a colliding object via the side door during a period of time from an input start time when the acceleration begins to be inputted from the reinforcement member to the side-collision detection sensor via the pillar during a side-collision to until an input end time that is a sensing limit for appropriately actuating a passenger protection device using the side-collision detection sensor.

A third aspect of the invention is the body structure having a side-collision detection sensor of the second aspect, wherein the relative relationship between the reinforcement member and the impact transmission member is set such that a peak value of a composite wave obtained by combining the waveform of the acceleration inputted to the side-collision detection sensor when the impact transmission member is not disposed and just the reinforcement member is disposed and the waveform of the acceleration inputted to the side-collision detection sensor when the reinforcement member is not disposed and just the impact transmission member is disposed appears a predetermined amount of time earlier than the input end time.

A fourth aspect of the invention is the body structure having a side-collision detection sensor of any of the first to third aspects, wherein the cross-sectional shape of the impact transmission member is substantially U-shaped or substantially hat-shaped, and the impact transmission member is fixed to a vehicle width direction outer side surface of the rocker such that the projecting portion of the impact transmission member faces the vehicle width direction outer side.

A fifth aspect of the invention is the body structure having a side-collision detection sensor of any of the first to third aspects, wherein the cross-sectional shape of the impact transmission member is substantially U-shaped or substantially hat-shaped, and the impact transmission member is disposed on an inner side surface of the outer cover member such that the projecting portion of the impact transmission member faces the vehicle width direction inner side.

A sixth aspect of the invention is the body structure having a side-collision detection sensor of any of the first to third aspects, wherein the outer cover member is made of resin, and the impact transmission member is a rib-like projecting portion molded integrally with the outer cover member.

According to the first aspect of the invention, during a side-collision of the side door, and particularly a side-collision of the side door against a pole in a diagonal direction, a colliding body such as a pole collides against the side door and thereafter collides with the impact transmission member that is disposed on the vehicle width direction outer side of the rocker, on the inner side of the outer cover member of the rocker, or on both. The impact transmission member projects a predetermined length in the vehicle width direction, so the colliding body quickly collides with the impact transmission member via the side door and transmits the impact to the rocker. That is, because the colliding body collides with the impact transmission member via the side door, a sudden acceleration occurs, and this acceleration (sensor G) is transmitted to the side-collision detection sensor attached at a predetermined position on the lower portion of the pillar via the rocker. As a result, the side-collision state is detected by the side-collision detection sensor.

In this manner, according to the first aspect of the invention, the body structure can handle various kinds of side-collision states, like a side-collision where the colliding body does not directly collide with the pillar, such as a side-collision at a position longitudinally offset with respect to the pillar and a side-collision in a diagonal direction, and particularly instances where a colliding body such as a pole collides in a diagonal direction.

According to the second aspect of the invention, the beam-like reinforcement member is disposed inside the side door across substantially the entire length of the side door along the door anteroposterior direction. For this reason, during a side-collision of the side door in a diagonal direction against a pole, for example, first the (door outer panel of the) side door becomes deformed inward in the vehicle width direction, and next the colliding body such as a pole collides with the reinforcement member via the side door and the reinforcement member begins to bend. When the reinforcement member bends, the acceleration is transmitted to the side-collision detection sensor via the pillar, and input of the acceleration is started. Next, the colliding body collides with the impact transmission member via the side door, whereby a sudden acceleration (sensor G) occurs, and this acceleration is transmitted and inputted to the side-collision detection sensor via the rocker and the pillar. As a result, detection of the side-collision state by the side-collision detection sensor is completed during the period of time from the input start time to until the input end time that is a sensing limit for appropriately actuating a passenger protection device.

According to the third aspect of the invention, a peak value of a composite wave is obtained by combining the waveform of the acceleration inputted to the side-collision detection sensor when just the reinforcement member that collides with the colliding body first via the side door is set and the waveform of the acceleration inputted to the side-collision detection sensor when just the impact transmission member collides with the colliding body thereafter is set. This peak value generally (although there is a slight time lag) represents a high value because it is the sum of the peak value of the acceleration resulting from disposing the reinforcement member and the peak value of the acceleration (i.e., a sudden acceleration (sensor G) that arises when the colliding body collides with the impact transmission member via the side door) resulting from disposing the impact transmission member, and assists detection (sensing) by the side-collision detection sensor.

Moreover, in the third aspect of the invention, the relative relationship between the reinforcement member and the impact transmission member is set such that the peak value of this composite wave appears a predetermined amount of time earlier than the input end time, so detection of the side-collision state by the side-collision detection sensor is completed at a point in time relatively earlier than earlier than the input start time.

According to the fourth aspect of the invention, the impact transmission member whose cross-sectional shape is substantially U-shaped or substantially hat-shaped is fixed to a vehicle width direction outer side surface of a strength member such as the rocker, so the acceleration that occurs when the colliding body collides with the impact transmission member is stable. Moreover, the impact transmission member is disposed such that its projecting portion faces the vehicle width direction outer side, so the collision detection direction is also stable. That is, factors causing error, such as the collision detection direction being offset when a colliding body collides, can be removed.

According to the fifth aspect of the invention, the impact transmission member whose cross-sectional shape is substantially U-shaped or substantially hat-shaped is disposed on an inner side surface of the outer cover member such that the projecting portion of the impact transmission member faces the vehicle width direction inner side, so first the colliding body collides with the outer cover member, and next the impact transmission member disposed on the inner side surface of the outer cover member contacts the rocker and transmits the acceleration to the side-collision detection sensor.

According to the sixth aspect of the invention, the rib-like projecting portion serving as the impact transmission member is disposed by integral molding on the outer cover member made of resin, so the disposed number, plate thickness, shape, and hardness and the like can be arbitrarily tuned.

As described above, in the first aspect of the invention, the impact transmission member that projects a predetermined length in the vehicle width direction is disposed on at least one of the vehicle width direction outer side of the rocker and the inner side of the outer cover member that covers the outer side of the rocker, so a sudden acceleration occurs when a colliding body collides with the impact transmission member, and this can be transmitted to the side-collision detection sensor via the rocker and the pillar. Consequently, an excellent effect is obtained in that the body structure can reliably detect, with the side-collision detection sensor disposed on the pillar, a side-collision of a pole against the side door and particularly a side-collision against a pole in a diagonal direction.

In the second aspect of the invention, the body structure is configure such that the impact transmission member collides with the colliding body during the period of time from the input start time of the acceleration resulting from the reinforcement member disposed inside the side door to until the input end time that is a sensing limit, so an excellent effect is obtained in that even a side-collision that is difficult to detect, such as a side-collision against a pole in a diagonal direction, can be rapidly and reliably detected by the side-collision detection sensor disposed on the pillar.

In the third aspect of the invention, the relative relationship between the reinforcement member and the impact transmission member is set such that the peak value of the composite wave appears a predetermined amount of time earlier than the input end time, so an excellent effect is obtained in that a side-collision that is difficult to detect, such as a side-collision against a pole in a diagonal direction, can be even more rapidly detected by the side-collision detection sensor disposed on the pillar.

In the fourth aspect of the invention, the impact transmission member whose cross-sectional shape is substantially U-shaped or substantially hat-shaped is fixed to a vehicle width direction outer side surface of the rocker such that its projecting portion faces the vehicle width direction outer side, so an excellent effect is obtained in that the reliability (detection precision) of the acceleration inputted to the side-collision detection sensor via the impact transmission member can be raised.

In the fifth aspect of the invention, the impact transmission member is disposed on an inner side surface of the outer cover member, so an excellent effect is obtained in that productivity and assemblability can be improved in comparison to when the impact transmission member is disposed on the rocker that is a strength member.

In the sixth aspect of the invention, the outer cover member is made of resin and the rib-like projecting portion serving as the impact transmission member is disposed by integral molding, so an excellent effect is obtained in that control of the load is easy.

BEST MODES FOR IMPLEMENTING THE INVENTION

First Embodiment

Below, a first embodiment of a body structure of a vehicle having a side-collision detection sensor pertaining to the present invention will be described using FIG. 1 to FIG. 4. It will be noted that arrow FR appropriately shown in these drawings represents the front side of the vehicle, arrow UP represents the upper side of the vehicle, arrow IN represents the inner side in the vehicle width direction, and arrow OUT represents the outer side in the vehicle width direction.

Figure 1:
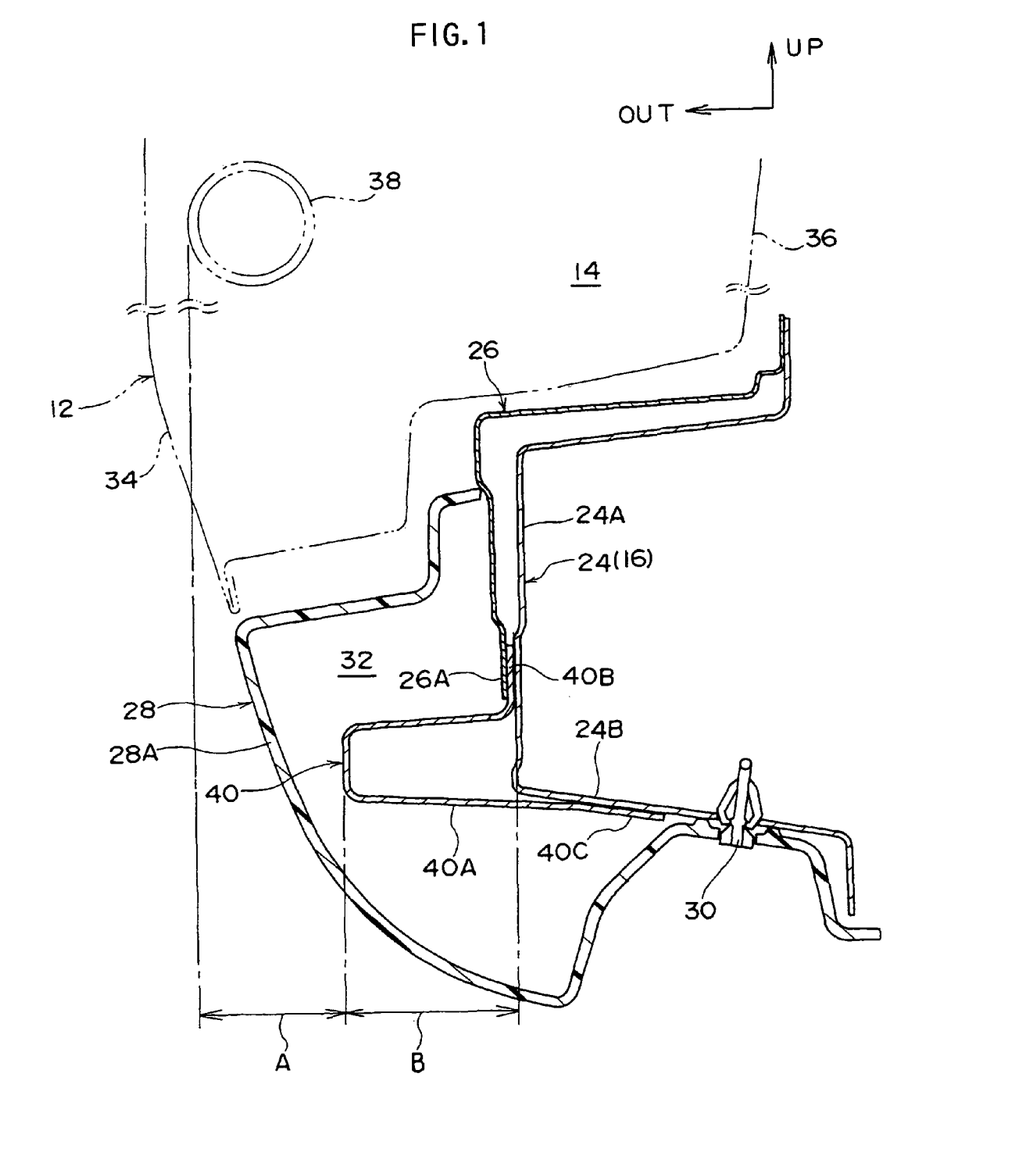
FIG. 1 is an enlarged cross-sectional view along line 1-1 of FIG. 2 showing relevant portions of a first embodiment.
Figure 2:
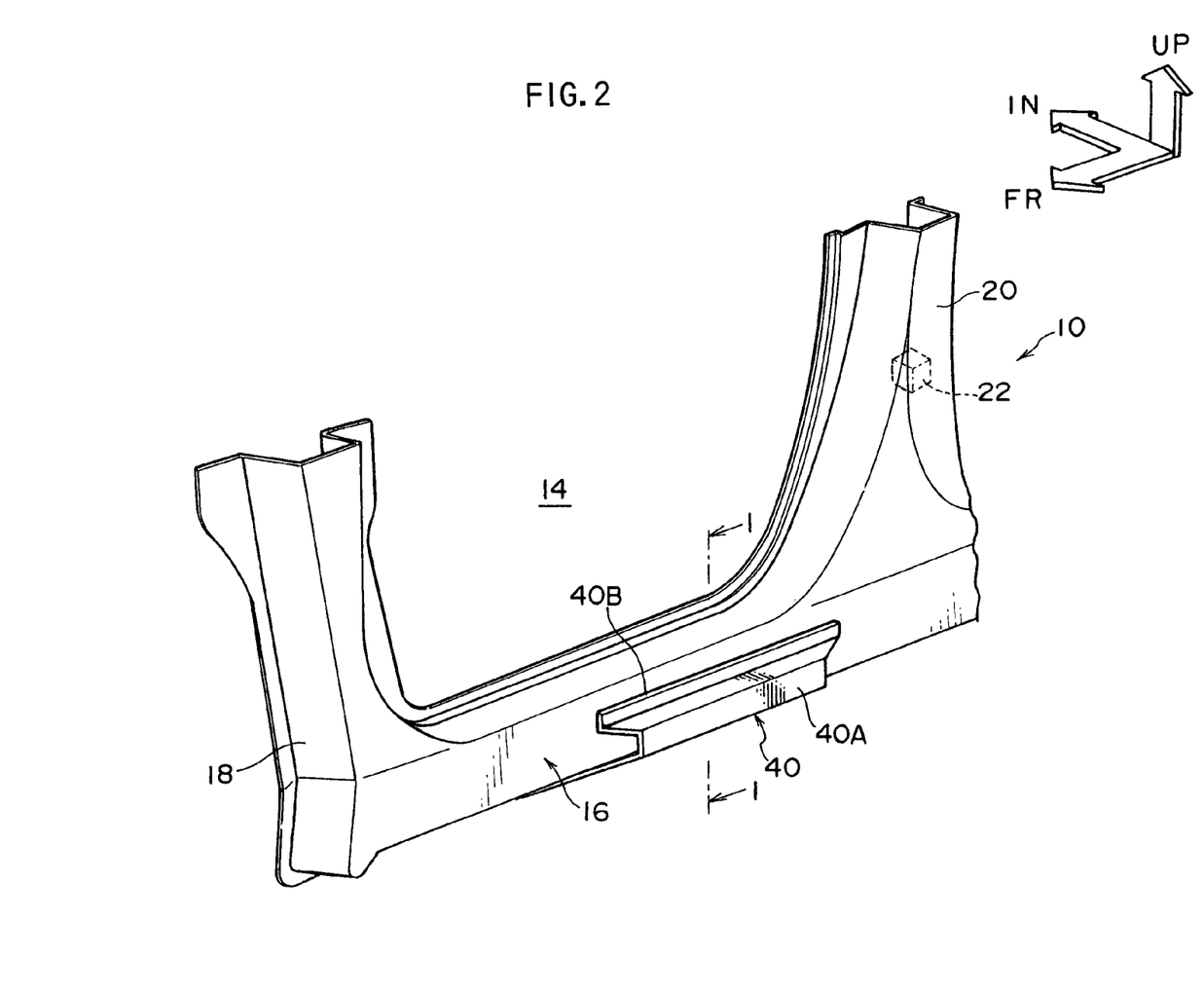
FIG. 2 is a general perspective view of a body structure around a front side door pertaining to the first embodiment.

In FIG. 2, there is shown a general perspective view of a body structure around a front side door of the vehicle. As shown in this drawing, a door open portion 14 that is opened and closed by a front side door 12 (see FIG. 1) is formed in a vehicle side portion 10. A rocker 16 having a closed cross-sectional structure that extends along the vehicle anteroposterior direction is disposed on the lower edge of the door open portion 14. Further, a front pillar 18 having a closed cross-sectional structure is disposed upright along substantially the vehicle vertical direction on the front side of the door open portion 14, and a center pillar 20 having a closed cross-sectional structure is disposed upright along substantially the vehicle vertical direction on the rear side of the door open portion 14. It will be noted that the rocker 16, the front pillar 18 and the center pillar 20 are all vehicle skeletal members.

Further, a side-collision detection sensor 22 for detecting a side-collision state is attached via an unillustrated attachment bracket to a predetermined position on a lower portion of the center pillar 20. It will be noted that in the present embodiment, a mechanical acceleration sensor is used as the side-collision detection sensor 22.

In FIG. 1, there is shown a longitudinal cross-sectional view of the rocker 16 positioned in the aforementioned door open portion 14. As shown in this drawing, the rocker 16 has as its main portions and is configured by a rocker outer panel 24 that is formed in a cross-sectional substantial hat shape and is disposed on the vehicle interior outer side, an unillustrated rocker inner panel that is formed in a cross-sectional substantial hat shape and is disposed on the vehicle interior inner side, and a cross-sectionally hook-shaped side member outer panel 26 that is fitted on the upper portion of the rocker outer panel 24. It will be noted that the closed cross-sectional structure is configured by the rocker outer panel 24 and the rocker inner panel, and in the cross-sectional position of FIG. 1, the side member outer panel 26 has a length as far as the height direction intermediate portion of a side wall portion 24A of the rocker outer panel 24, but in other cross-sectional positions the side member outer panel 26 extends as far as the lower end portion of the side wall portion 24A of the rocker outer panel 24.

Moreover, a rocker molding 28 made of resin is attached by a clip 30 to the outer side of the aforementioned rocker outer panel 24. It will be noted that in the cross-sectional position shown in FIG. 1, just the inner side end portion of the rocker molding 28 is fixed by the clip 30, but in other cross-sectional positions the rocker molding 28 is fixed by clips at two upper and lower places at sites in the vicinities of the inner side end portion and the upper end portion of the rocker molding 28.

In a state where the aforementioned rocker molding 28 is attached to the rocker outer panel 24, a predetermined clearance 32 is formed in the vehicle width direction between the side wall portion 24A of the rocker outer panel 24 and a side wall portion 28A of the rocker molding 28.

Further, as indicated by the hypothetical line in FIG. 1, the front side door 12 has as its main portions and is configured by a door outer panel 34 and a door inner panel 36, and the side wall portion 28A of the rocker molding 28 is rounded so as to follow the outer shape of the door outer panel 34.

An impact beam 38 serving as a reinforcement member is disposed inside the front side door 12 along the door anteroposterior direction. The impact beam 38 is a pipe-like member having a predetermined strength and rigidity, and both of its longitudinal direction end portions are fixed to the front end portion and the rear end portion of the door inner panel 36. It will be noted that in FIG. 1, the impact beam 38 is shown in a position lower than its actual position using ellipsis notation. Further, the rear end portion of the impact beam 38 overlaps the center pillar 20 when seen from the vehicle side and is configured such that the force of impact during a side-collision is transmitted thereby. Moreover, although the impact beam 38 may be a pipe-like member, it may also be a bar-like member, and the number of disposed impact beams may be one or plural.

Figure 3:
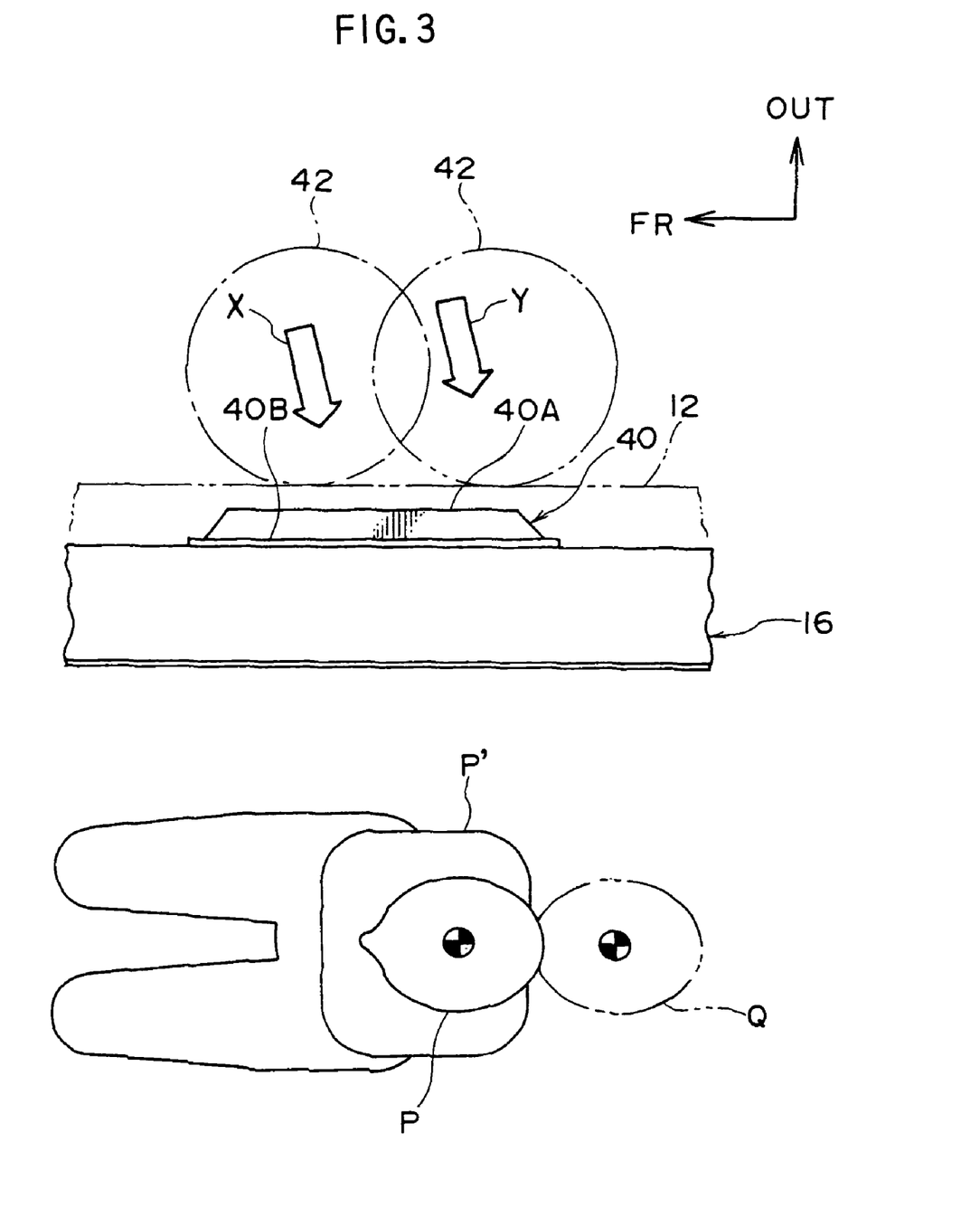
FIG. 3 is a plan view showing the disposed position of a bracket shown in FIG. 1 in relation to a passenger.

Here, as shown in FIG. 1 to FIG. 3, an elongate bracket 40 serving as a impact transmission member is attached to the vehicle width direction outer side of a site P' corresponding to the side region of a seated passenger P (see FIG. 3) in the longitudinal direction of the rocker 16.

To describe this in greater detail, as shown in FIG. 1, the bracket 40 is disposed on the outer side of the lower portion of the side wall portion 24A of the rocker outer panel 24 of the rocker 16, and its cross-sectional shape is formed in a substantial hat shape. That is, the bracket 40 is configured by a body portion 40A formed in a cross-sectional U shape, an upper end flange portion 40B that is bent toward the vehicle upper side from the upper end portion of the body portion 40A, and a lower end flange portion 40C that extends as is inward in the vehicle width direction from the lower end portion of the body portion 40A. The upper end flange portion 40B is sandwiched between the side wall portion 24A of the rocker outer panel 24 and a lower end portion 26A of the side member outer panel 26 and is joined to these by spot welding in a state where the three are overlaid. Further, the lower end flange portion 40C is joined by spot welding to a lower portion 24B of the rocker outer panel 24.

As shown in FIG. 1, in a state where the bracket 40 is fixed to the lower portion of the side wall portion 24A of the rocker outer panel 24, when A represents the distance from the outside end portion of the outer peripheral surface of the impact beam 38 to the body portion 40A of the bracket 40, then the length that the bracket 40 projects outward in the vehicle width direction from the side wall portion 24A of the door outer panel 34 of the bracket 40 is set to B. It will be noted that although it is necessary for the distance B to be a length where the door outer panel 34 does not interfere with the side wall portion 28A of the rocker molding 28, it is possible to change the performance of the transmission of the collision load during a side-collision to the side-collision detection sensor 22 depending on how this distance B is set in relation to the distance A.

Further, although the bracket 40 is a steel plate bracket configured by press molding, the bracket 40 is not limited to this; even an extrusion-molded article or a cast article of an aluminium alloy is applicable as long as the impact transmission performance required of the bracket 40 is obtained.

Moreover, the aforementioned bracket 40 is set such that the body portion 40A of the bracket 40 collides with a colliding body 42 during a period of time from an input start time (point c in FIG. 4) when an acceleration begins to be inputted from the impact beam 38 to the side-collision detection sensor 22 via the center pillar 20 during a side-collision to until an input end time (point g in FIG. 4) that is a sensing limit (this is represented by one-dotted chain line Z in FIG. 4) for actuating a head region protection airbag device or a side airbag device that are passenger protection devices using the side-collision detection sensor 22. This point will be described in detail in the "(Action/Effects)" to be described next.

(Action/Effects)

Next, the action and effects of the present embodiment will be described.

Assuming now that the seat position of the passenger is selected further toward the vehicle rear side than a standard position and that a passenger is present in a position relatively close to the center pillar 20 (the position of the head region of the passenger in this case is represented by Q in FIG. 3), even if the colliding body 42 such as a pole were to collide against the side in a diagonal direction (Y direction in FIG. 3), the force of impact is transmitted to the center pillar 20 via the impact beam 38, so the side-collision detection sensor 22 can detect that side-collision state.

On the other hand, when the seat position of the passenger is set in the intermediary vicinity between the front pillar 18 and the center pillar 20 (that is, when the passenger is seated in the position of P in FIG. 3), when the colliding body 42 such as a pole collides in the vicinity of the anteroposterior direction intermediate portion of the front side pillar 12 in a diagonal direction (X direction in FIG. 3), it is difficult to detect the side-collision state in a short amount of time simply by the acceleration inputted from the impact beam 38 to the side-collision detection sensor 22 via the center pillar 20.

Here, in the body structure having a side-collision detection sensor pertaining to the present embodiment, the following action is obtained because the bracket 40 that projects outward in the vehicle width direction is disposed on the outer side lower portion of the rocker outer panel 24.

Figure 4:
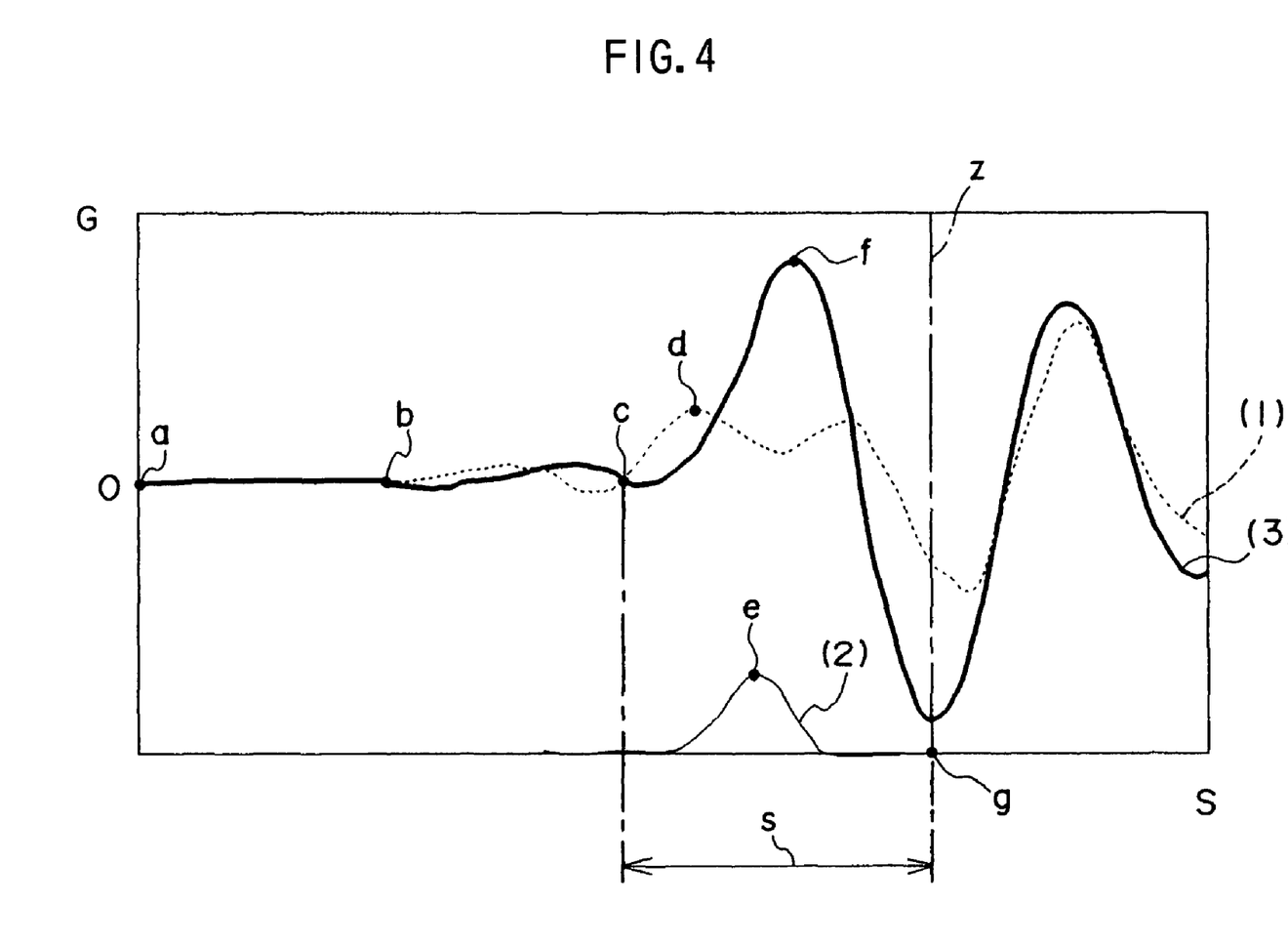
FIG. 4 is a G-S line diagram when using a body structure having a side-collision detection sensor pertaining to the first embodiment.

That is, during a side-collision of the front side door 12 against a pole in a diagonal direction (X direction in FIG. 3) such as mentioned above, first the colliding body 42 collides with the door outer panel 34 of the front side door 12 (point a in FIG. 4), causes the door outer panel 34 to be deformed inward in the vehicle width direction, and thereafter collides with the impact beam 38 (point b in FIG. 4). It will be noted that the time from point a to point b is a time during which the colliding body 42 is free-running.

To supplement the graphs in FIG. 4, dotted line graph (1) in FIG. 4 is a G (sensor acceleration)-S (time) line diagram when just the impact beam 38 is disposed inside the front side door 12 and the bracket 40 is not disposed, narrow line graph (2) is a G-S line diagram when the impact beam 38 is not disposed and just the bracket 40 is set on the rocker 16, and thick line graph (3) is a G-S line diagram in the case of the present embodiment disposed with both the impact beam 38 and the bracket 40. It will be noted with respect to graph (2) that just the characteristic portion of the waveform has been extracted and shown by itself in a position away from graph (1).

After the colliding body 42 collides with the impact beam 38, the impact beam 38 begins to bend inward in the vehicle width direction. The impact beam 38 begins to bend inward, and input of the acceleration to the center pillar 20—and therefore the side-collision detection sensor 22—via the impact beam 38 is started from point c. Then, at point d of graph (1), the bending amount of the impact beam 38 reaches a maximum, and the sensor G also reaches a maximum.

Meanwhile, the colliding body 42 collides with the body portion 40A of the bracket 40 at substantially the same time as when input is started to the center pillar 20 via the impact beam 38 (i.e., at substantially the same time as point c). As shown in graph (2), the G-S characteristic of the bracket 40 by itself has a peak value (point e) that is about the same as that of the impact beam 38. However, because first the impact beam 38 begins to bend and then deformation of the bracket 40 begins thereafter, the time when the peak value appears is somewhat later in the case of the bracket 40 than in the case of the impact beam 38.

As described above, because of the fact that the bracket 40 becomes deformed after the impact beam 38 bends, graph (1) and graph (2), which are both G-S characteristics, are combined by the principle of superposition to become graph (3) of the present embodiment. That is, as a result of the impact beam 38 sufficiently bending and the bracket 40 also being sufficiently deformed, a sudden deceleration arises and this becomes a peak value (point f) that is equal to the sum of the peak value (point d) of graph (1) and the peak value (point e) of graph (2). Thus, the side-collision detection sensor 22 can detect the side-collision state from the peak value (point f).

Moreover, because this peak value (point f) occurs at a much earlier stage than the sensing limit (point g), passenger protection devices such as a head region protection airbag device and a side airbag device can be rapidly and reliably actuated.

It will be noted that point c in FIG. 4 is an "input start time" in a second embodiment of the present invention and point g corresponds to an "input end time".

Further, in the body structure having a side-collision detection sensor pertaining to the present embodiment, the relative relationship between the impact beam 38 and the bracket 40 (the relationship between distance A and distance B, and the plate thickness, material, strength, and rigidity and the like of the impact beam 38 and the bracket 40) is set such that the peak value (point f) appears a predetermined amount of time earlier than the input end time (point g).

The "predetermined amount of time" referred to here may be set such that, assuming that s represents the amount of time from point c to point g, the peak value f appears at least $s \times (1/10)$ earlier than the sensing limit (line z). Preferably, the predetermined amount of time may be set such that the peak f appears $s \times (1/4)$ to $s \times (1/3)$ earlier. With respect to the values $s \times (1/10)$ and $s \times (1/4)$ to $s \times (1/3)$, in view of appropriately actuating passenger protection devices during a side-collision, these have the meaning that "effects can be expected" when the peak value (point f) can be made to occur earlier than the input end time (point g) by about $s \times (1/10)$ and the meaning that "effects are clearly apparent" when the peak value (point f) can be made to occur earlier than the input end time (point g) by about $s \times (1/4)$ to $s \times (1/3)$.

In this manner, according to the body structure of a vehicle having a side-collision detection sensor pertaining to the present embodiment, the bracket 40 that projects a predetermined length in the vehicle width direction is disposed on the vehicle width direction outer side of the rocker 16, so a sudden deceleration occurs when the colliding body 42 collides with the bracket 40, and this can be transmitted to the side-collision detection sensor 22 via the rocker 16 and the center pillar 20. Consequently, the body structure can reliably detect, with the side-collision detection sensor 22 disposed on the center pillar 20, a side-collision of the front side door 12 against a pole and particularly a side-collision against a pole in a diagonal direction.

In particular, the body structure is configured such that the bracket 40 collides with the colliding body 42 during a period of time from the input start time (point c) of the acceleration via the impact beam 38 disposed inside the front side door 12 to until the input end time (point g) that is a sensing limit (line Z), so even a side-collision that is difficult to detect, such as a side-collision against a pole in a diagonal direction, can be rapidly and reliably detected by the side-collision detection sensor 22 disposed on the center pillar 20.

Moreover, in the present embodiment, the relative relationship between the impact beam 38 and the bracket 40 is set such that the peak value (point f) of graph (3) appears a predetermined amount of time earlier than the input end time (point g), so a side-collision that is difficult to detect, such as a side-collision against a pole in a diagonal direction, can be even more rapidly and reliably detected by the side-collision detection sensor 22 disposed on the center pillar 20.

In addition, in the body structure having a side-collision detection sensor pertaining to the present embodiment, the metal bracket 40 whose cross-sectional shape is substantially hat-shaped is fixed to the vehicle width direction outer side surface of the rocker 16 that is a reinforcement member such that the body portion 40A faces the vehicle width direction outer side, so the acceleration inputted to the side-collision detection sensor 22 via the bracket 40 is stable. Moreover, because the state of attachment of the bracket 40 to the rocker 16 is stable, factors causing error, such as the collision detection direction being offset when the colliding body 42 collides, can be removed. As a result, the reliability (detection precision) of detection of the side-collision state by the side-collision detection sensor 22 can be raised.

Second Embodiment

Next, a second embodiment of the body structure having a side-collision detection sensor pertaining to the present invention will be described using FIG. 5 to FIG. 10. It will be noted that the same numbers will be given to configural portions that are the same as those of the preceding first embodiment and that description of those same configural portions will be omitted.

Below, these will be described in order beginning with the configuration shown in FIG. 5.

Figure 5:
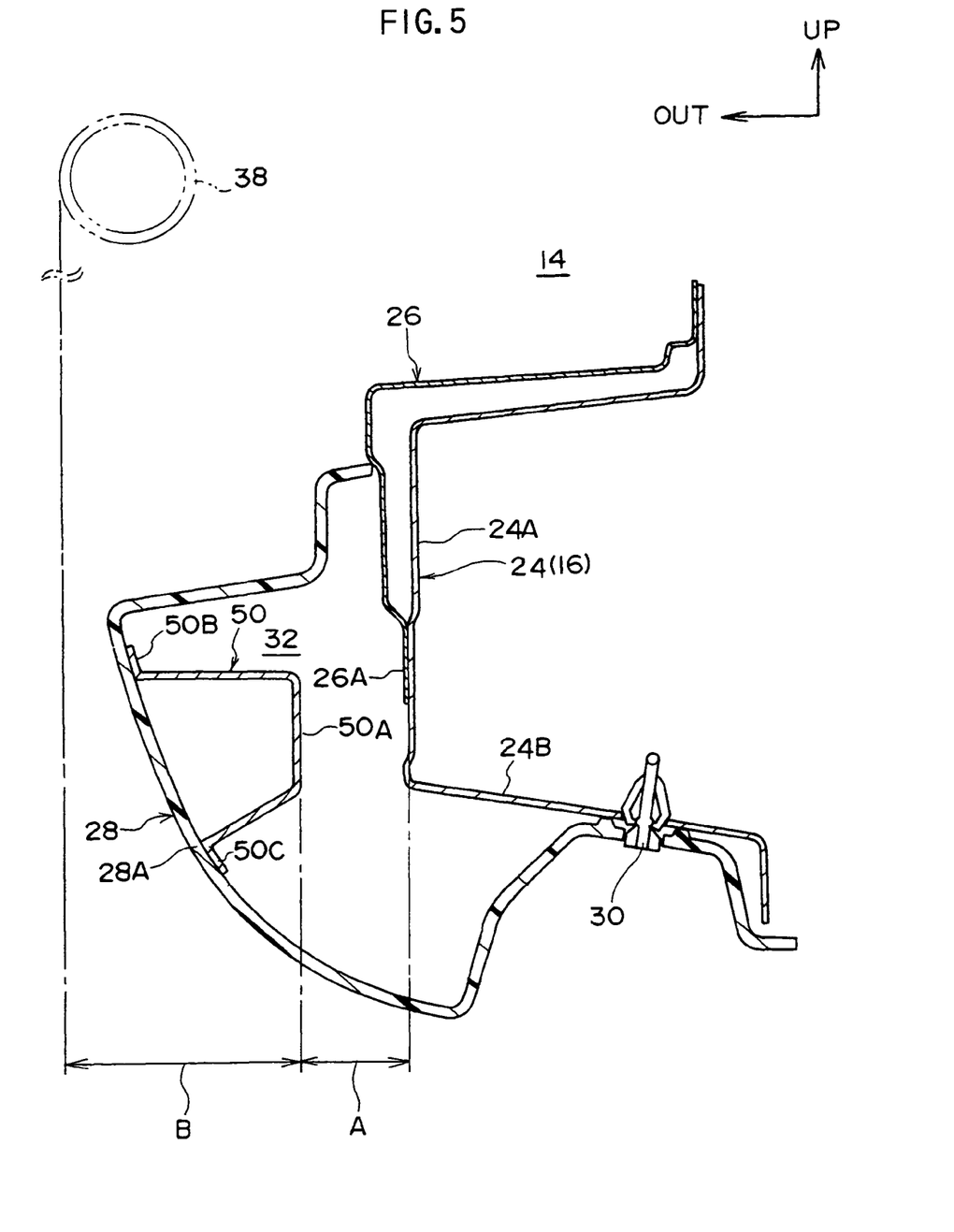
FIG. 5 is a longitudinal cross-sectional view corresponding to FIG. 1 that pertains to a second embodiment and shows an example where a impact transmission member is set on a rocker molding.

The embodiment shown in FIG. 5 is characterized in that a bracket 50 whose cross-sectional shape is hat-shaped is attached to the inner side of the side wall portion 28A of the rocker molding 28 serving as an outer cover member that covers the outer side of the rocker outer panel 24. The bracket 50 is configured by a U-shaped body portion 50A that faces the side wall portion 24A of the rocker outer panel 24, an upper end flange portion 50B, and a lower end flange portion 50C. The distance from the U-shaped body portion 50A of the bracket 50 to the side wall portion 24A corresponds to distance A of the preceding first embodiment, and the distance from the outer end of the impact beam 38 to the top wall portion of the body portion 50A corresponds to distance B of the preceding first embodiment.

According to this configuration, the bracket 50 whose cross-sectional shape is substantially hat-shaped is set on the inner side of the side wall portion 28A of the rocker molding 28 such that the U-shaped body portion 50A faces the vehicle width direction inner side, so the colliding body 42 first collides with the rocker molding 28, and then the bracket 50 collides with the side wall portion 24A of the rocker outer panel 24 and transmits the acceleration to the side-collision detection sensor 22 via the center pillar 20.

When the bracket 50 is set on the rocker molding 28 in this manner, attachment of the bracket 50 is completed in the vehicle assembly plant by fixing the rocker molding 28, to which the bracket 50 has already been attached, to the side wall portion of the rocker outer panel 28 with the clip 30, so assemblability and productivity can be increased in comparison to when the bracket is set on the rocker 16 that is a reinforcement member.

Figure 6:
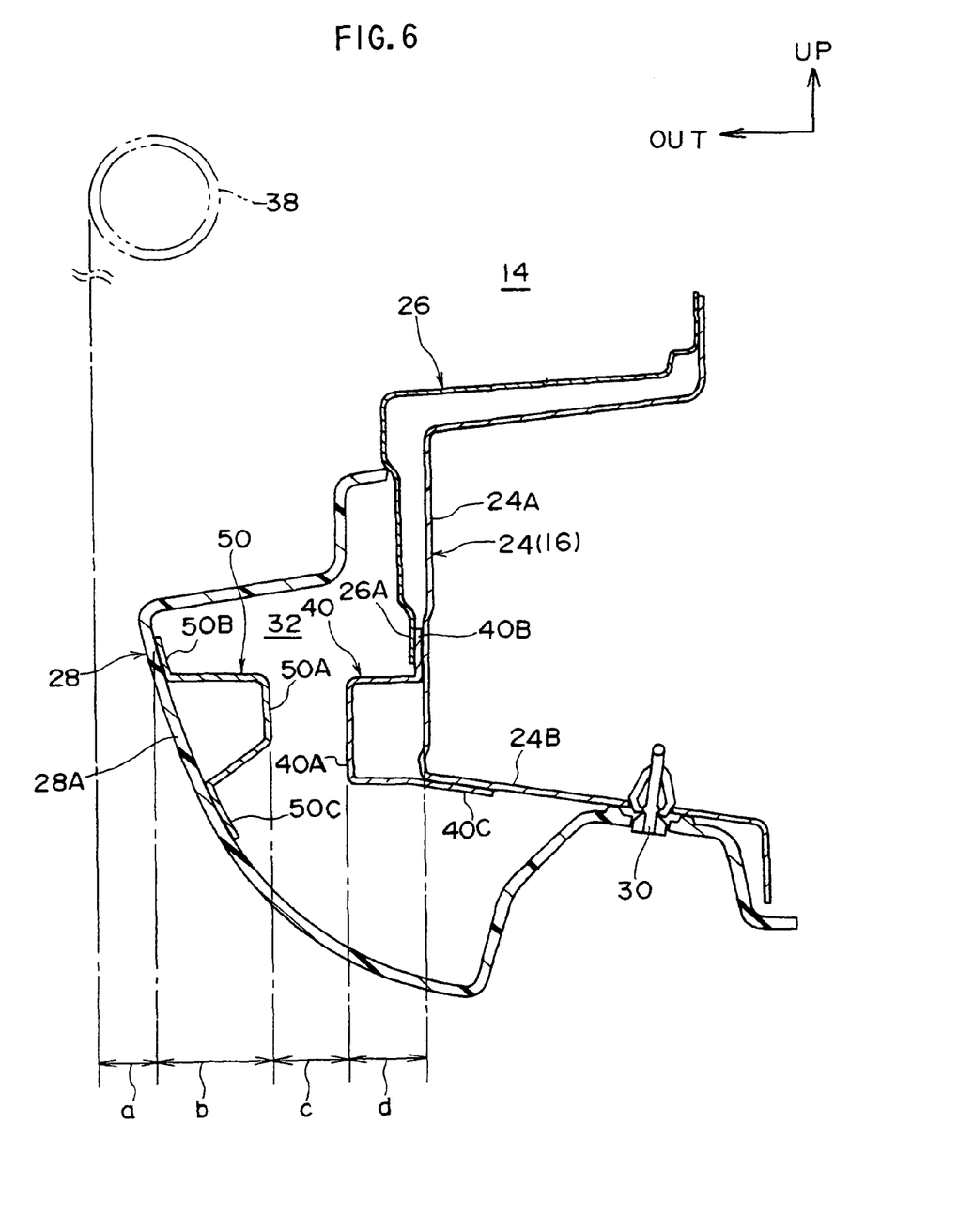
FIG. 6 is a longitudinal cross-sectional view corresponding to FIG. 1 that pertains to the second embodiment and shows an example where the impact transmission member is set on both a rocker outer panel and the rocker molding.

The embodiment shown in FIG. 6 is characterized in that brackets 40 and 50 are respectively set on both the rocker outer panel 24 and the rocker molding 28.

In this case, the sum of distance a from the outer end of the impact beam 38 to the upper end flange portion 50B of the bracket 50 and distance c from the body portion 50A of the bracket 50 to the body portion 40A of the bracket 40 corresponds to distance A of the preceding first embodiment (A=a+c), and the sum of the projecting height b of the body portion 50A of the bracket 50 and the projecting height d of the body portion 40A of the bracket 40 corresponds to distance B of the preceding first embodiment (B=b+d).

Figure 7:
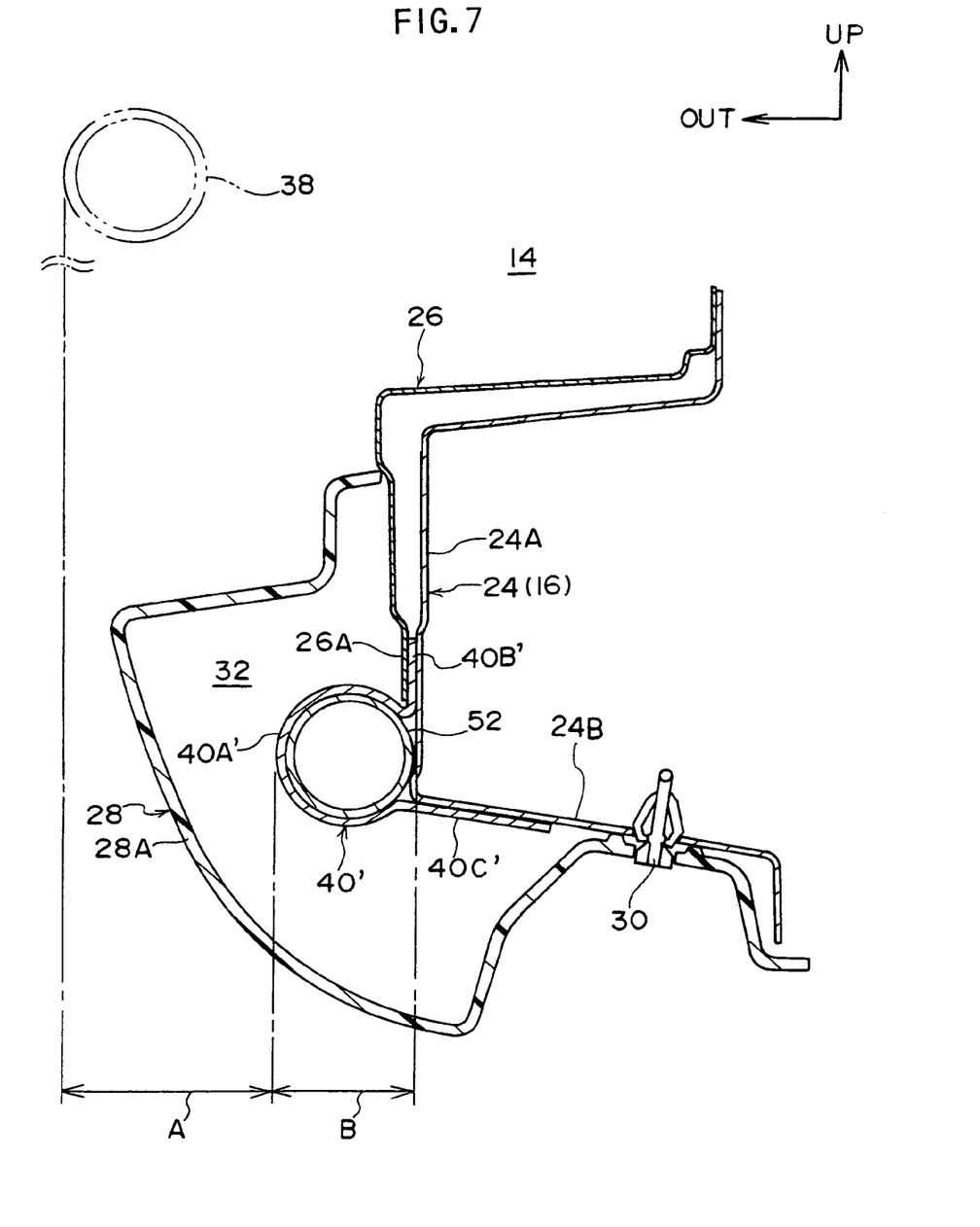
FIG. 7 is a longitudinal cross-sectional view corresponding to FIG. 1 that pertains to the second embodiment and shows an example where a rocker beam is set on the rocker outer panel.

The embodiment shown in FIG. 7 is characterized in that, rather than a cross-sectionally hat-shaped bracket, a pipe-like rocker beam 52 corresponding to an impact beam is set on the rocker outer panel 24. It will be noted that the rocker beam 52 is attached to the vehicle width direction outer side of the rocker outer panel 24 by a clamp-like bracket 40'. The bracket 40' is different from the cross-sectionally substantially hat-shaped bracket 40 in the preceding first embodiment in that the shape of its body portion 40A' forms a circular arc cross section capable of being fitted to the rocker beam 52, but the functions of the respective portions are no different from those of the bracket 40, so an apostrophe has been added to the reference numeral of each portion.

According to this configuration also, effects that are the same as those of the preceding first embodiment are obtained. It will be noted that the relationship between the dimensions of A and B is the same as in the case of the first embodiment.

Figure 8:
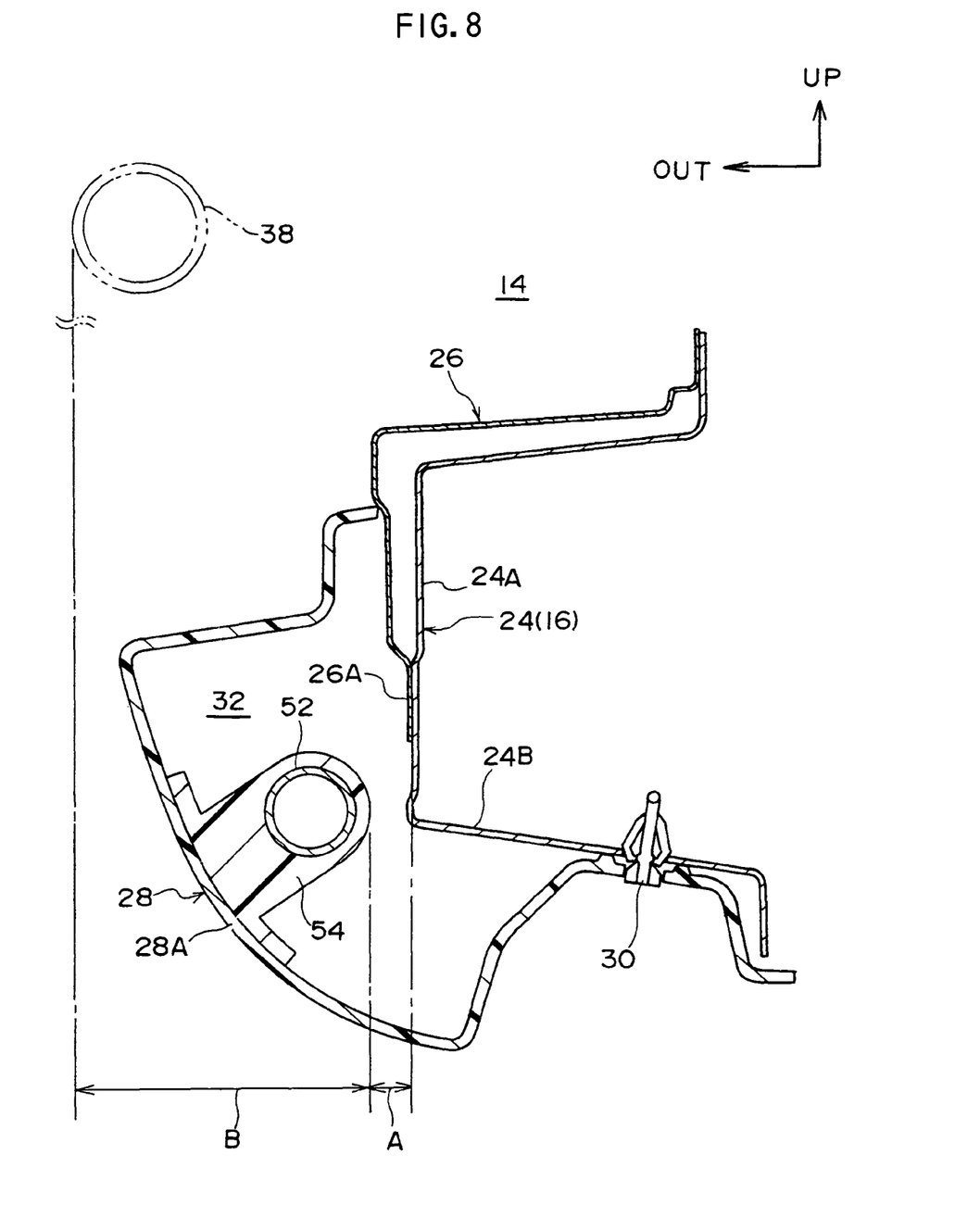
FIG. 8 is a longitudinal cross-sectional view corresponding to FIG. 1 that pertains to the second embodiment and shows an example where the rocker beam is set on the rocker molding.

The embodiment shown in FIG. 8 is characterized in that the rocker beam 52 is disposed on the inner side of the side wall portion 28A of the rocker molding 28. It will be noted that an attachment seat 54 made of resin is used when setting the rocker beam 52 on the rocker molding 28.

Consequently, the basic performance is the same as that of the configuration shown in FIG. 5, and in regard to the performance of using the rocker beam 52, a performance that is the same as that of the configuration shown in FIG. 7 is obtained. It will be noted that the relationship between the dimensions of A and B is the same as in the case of FIG. 5.

Figure 9:
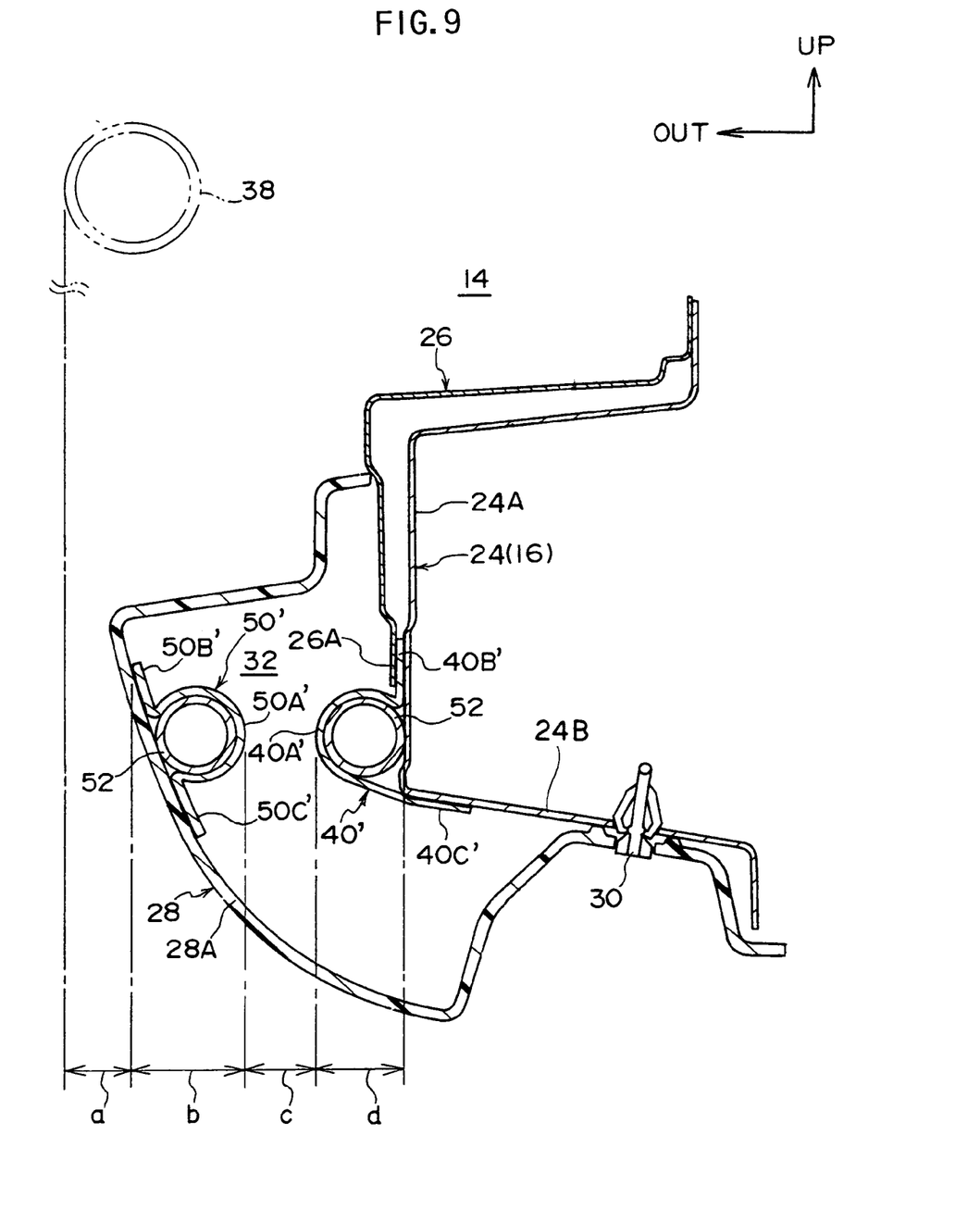
FIG. 9 is a longitudinal cross-sectional view corresponding to FIG. 1 that pertains to the second embodiment and shows an example where the rocker beam is set on both the rocker outer panel and the rocker molding.

The embodiment shown in FIG. 9 is characterized in that rocker beams 52 are respectively disposed in the combined type of FIG. 6 where the brackets 40 and 50 are disposed on both the rocker outer panel 28 and the rocker molding 28.

Consequently, the basic performance is the same as that of the configuration shown in FIG. 6, and in regard to the performance of using the rocker beams 52, a performance that is the same as that of the configuration shown in FIG. 7 is obtained. It will be noted that the relationship between the dimensions of A and B is the same as in the case of FIG. 6.

Figure 10:
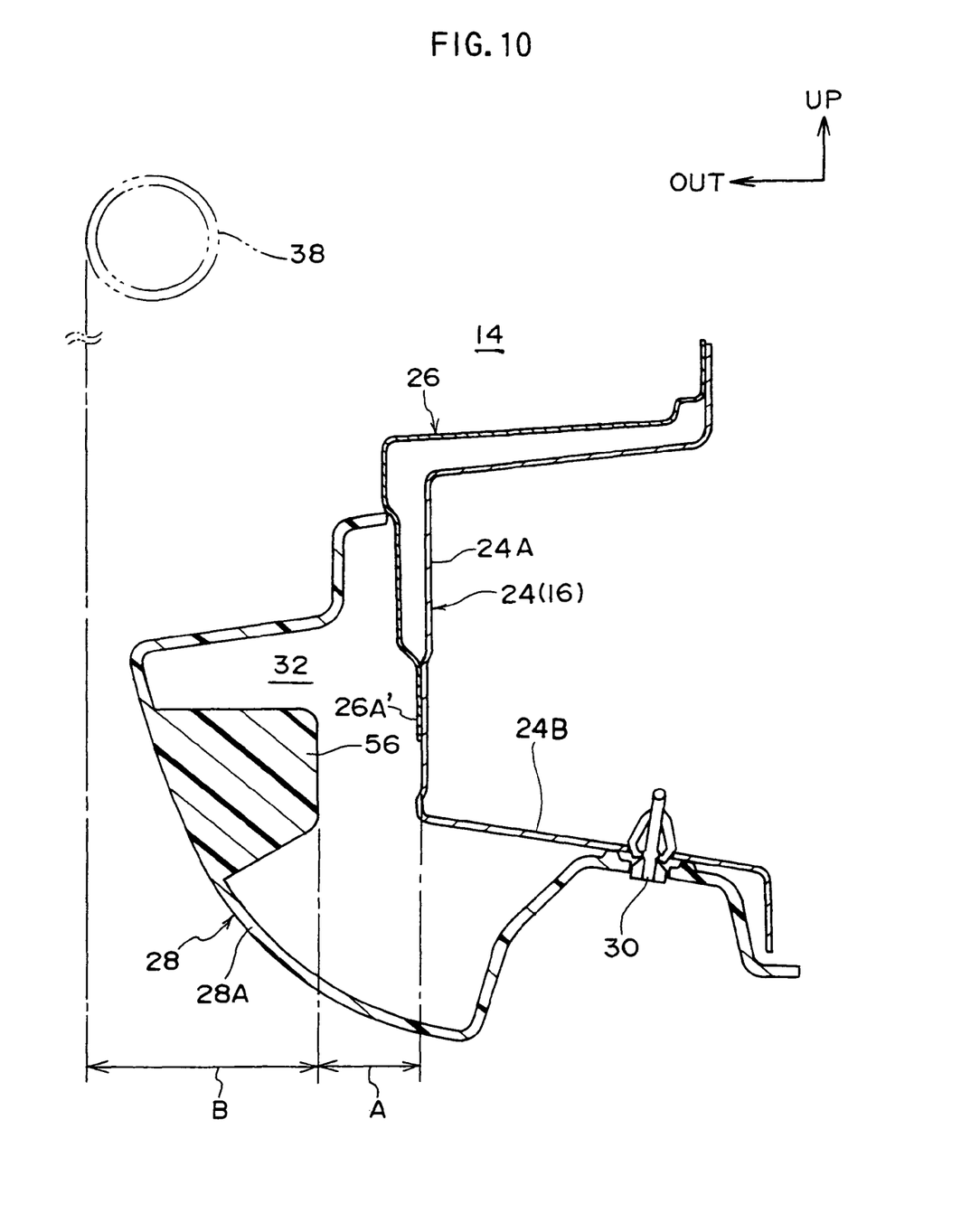
FIG. 10 is a longitudinal cross-sectional view corresponding to FIG. 1 that pertains to the second embodiment and shows an example where a rib that is integrally molded with the rocker molding is set on the rocker molding.

The embodiment shown in FIG. 10 is characterized in that, although it is the same as in the case of FIG. 5 where a impact transmission member is set on the inner side surface of the side wall portion 28A of the rocker molding 28, in the case of this embodiment, a rib 56 made of resin and serving as a impact transmission member is formed integrally with the rocker molding 28 utilizing the fact that the rocker molding 28 is made of resin. The cross-sectional shape of the rib 56 is substantially trapezoidal but is not limited to this and may be another shape. Further, the rib 56 may be disposed upright from the inner side surface of the side wall portion 28A independently with a predetermined clearance in the vehicle anteroposterior direction, or adjacent ribs 56 may be interconnected in the vehicle anteroposterior direction, or a single rib may that is continuous (without a break) in the vehicle anteroposterior direction may be set. In that case, the rib may be hollow or solid.

According to this configuration, the body structure is given a configuration where the rib 56 made of resin is disposed by integral molding on the rocker molding 28 made of resin, so the set number, plate thickness, shape, and hardness and the like of the rib 56 can be selected arbitrarily to a certain extent. Consequently, there is the advantage that its performance as a impact transmission member can be arbitrarily tuned.

Supplementary Description of the Embodiments

Below, several supplementary descriptions will be given in regard to the preceding embodiments 1 and 2.

(1) In the preceding embodiments, the present invention was applied using the front side door 12 as an example, but the invention is not limited to this and may also be applied to a rear side door.

(2) In the preceding embodiments, the invention was described using as a target a configuration where the impact beam 38 was disposed inside the front side door 12, but the invention is not limited to this and is also applicable to a vehicle where an impact beam is not disposed inside the side door. In that case, the material, shape, dimension, hardness, and disposed range and the like of the impact transmission member may be selected such that the acceleration (sensor G) of the impact beam 38 is anticipated (incorporated) by the impact transmission member.

(3) In the preceding embodiments, the present invention was applied to a configuration where the side-collision detection sensor 22 was disposed inside the center pillar 20, but the invention is not limited to this and may also be applied to a configuration where the side-collision detection sensor is disposed on a quarter pillar (C pillar) or a front pillar. For example, with respect to rear side doors in a vehicle where head region airbag devices for front and rear seats are installed, sometimes a side-collision with the front half of the rear side door is handled (detected) by a side-collision detection sensor disposed on the center pillar and a side-collision with the rear half of the rear side door is handled (detected) by a side-collision detection sensor disposed on the quarter pillar, and in that case, the same problem occurs in the relationship with the side-collision detection sensor disposed on the quarter pillar, so it is extremely productive to apply the present invention.

(4) By "appropriately" in the second embodiment of the present invention is meant that, when the passenger protection device is a head region protection airbag device, for example, the airbag deploys without delay between the head region of the passenger and the inner side surface of the vehicle body side portion during a side-collision. Further, by "sensing limit" is not meant the latest time for actuating a passenger protection device but the latest time required in order to "appropriately" actuate the passenger protection device.

INDUSTRIAL APPLICABILITY

A body structure having a side-collision detection sensor that can reliably detect, with a side-collision detection sensor disposed on a pillar, a side-collision of a side door against a pole and particularly a side-collision against a pole in a diagonal direction.

The invention claimed is:

1. A body structure having a side-collision detection sensor configured to include:
   a side door that opens and closes a door open portion in a vehicle body side portion;
   a rocker disposed along a vehicle anteroposterior direction on a lower edge of the door open portion; and
   a pillar that rises toward a vehicle upper side from a predetermined position in a longitudinal direction of the rocker, with a side-collision detection sensor that detects a side-collision state from an acceleration being attached at a predetermined position on a lower portion of the pillar,
   wherein a impact transmission member that projects a predetermined length in a vehicle width direction and transmits impact during a side-collision to the side-collision detection sensor is disposed on at least one of a vehicle width direction outer side of a site corresponding to a side region of a seated passenger in the longitudinal direction of the rocker and an inner side of an outer cover member that covers an outer side portion of the rocker.

2. The body structure having a side-collision detection sensor of claim 1, wherein
a beam-like reinforcement member is disposed inside the side door across substantially the entire length of the side door along the door anteroposterior direction, and
the body structure is configured such that the impact transmission member collides with a colliding object via the side door during a period of time from an input start time when the acceleration begins to be inputted from the reinforcement member to the side-collision detection sensor via the pillar during a side-collision to until an input end time that is a sensing limit for appropriately actuating a passenger protection device using the side-collision detection sensor.

3. The body structure having a side-collision detection sensor of claim 2, wherein the relative relationship between the reinforcement member and the impact transmission member is set such that a peak value of a composite wave obtained by combining the waveform of the acceleration inputted to the side-collision detection sensor when the impact transmission member is not disposed and just the reinforcement member is disposed and the waveform of the acceleration inputted to the side-collision detection sensor when the reinforcement member is not disposed and just the impact transmission member is disposed appears a predetermined amount of time earlier than the input end time.

4. The body structure having a side-collision detection sensor of claim 1, wherein the cross-sectional shape of the impact transmission member is substantially U-shaped or substantially hat-shaped, and the impact transmission member is fixed to a vehicle width direction outer side surface of the rocker such that the projecting portion of the impact transmission member faces the vehicle width direction outer side.

5. The body structure having a side-collision detection sensor of claim 2, wherein the cross-sectional shape of the impact transmission member is substantially U-shaped or substantially hat-shaped, and the impact transmission member is fixed to a vehicle width direction outer side surface of the rocker such that the projecting portion of the impact transmission member faces the vehicle width direction outer side.

6. The body structure having a side-collision detection sensor of claim 3, wherein the cross-sectional shape of the impact transmission member is substantially U-shaped or substantially hat-shaped, and the impact transmission member is fixed to a vehicle width direction outer side surface of the rocker such that the projecting portion of the impact transmission member faces the vehicle width direction outer side.

7. The body structure having a side-collision detection sensor of claim 1, wherein the cross-sectional shape of the impact transmission member is substantially U-shaped or substantially hat-shaped, and the impact transmission member is disposed on an inner side surface of the outer cover member such that the projecting portion of the impact transmission member faces the vehicle width direction inner side.

8. The body structure having a side-collision detection sensor of claim 2, wherein the cross-sectional shape of the impact transmission member is substantially U-shaped or substantially hat-shaped, and the impact transmission member is disposed on an inner side surface of the outer cover member such that the projecting portion of the impact transmission member faces the vehicle width direction inner side.

9. The body structure having a side-collision detection sensor of claim 3, wherein the cross-sectional shape of the impact transmission member is substantially U-shaped or substantially hat-shaped, and the impact transmission member is disposed on an inner side surface of the outer cover member such that the projecting portion of the impact transmission member faces the vehicle width direction inner side.

10. The body structure having a side-collision detection sensor of claim 1, wherein the outer cover member is made of resin, and the impact transmission member is a rib-like projecting portion molded integrally with the outer cover member.

11. The body structure having a side-collision detection sensor of claim 2, wherein the outer cover member is made of resin and the impact transmission member is a rib-like projecting portion molded integrally with the outer cover member.

12. The body structure having a side-collision detection sensor of claim 3, wherein the outer cover member is made of resin and the impact transmission member is a rib-like projecting portion molded integrally with the outer cover member.

13. The body structure having a side-collision detection sensor of claim 1, wherein the side door is a front side door.

14. The body structure having a side-collision detection sensor of claim 13, wherein the pillar to which the side-collision detection sensor is attached is a center pillar.

15. The body structure having a side-collision detection sensor of claim 13, wherein the pillar to which the side-collision detection sensor is attached is a front pillar.

16. The body structure having a side-collision detection sensor of claim 1, wherein the side door is a rear side door.

17. The body structure having a side-collision detection sensor of claim 16, wherein the pillar to which the side-collision detection sensor is attached is a center pillar.

18. The body structure having a side-collision detection sensor of claim 16, wherein the pillar to which the side-collision detection sensor is attached is a quarter pillar.

19. The body structure having a side-collision detection sensor of claim 2, wherein the side door is a front side door.

20. The body structure having a side-collision detection sensor of claim 2, wherein the side door is a rear side door.

* * * * *